Oct. 21, 1924.
J. ALLINGHAM
PROCESS OF REDUCING ORE
Filed Aug. 1, 1921
1,512,262
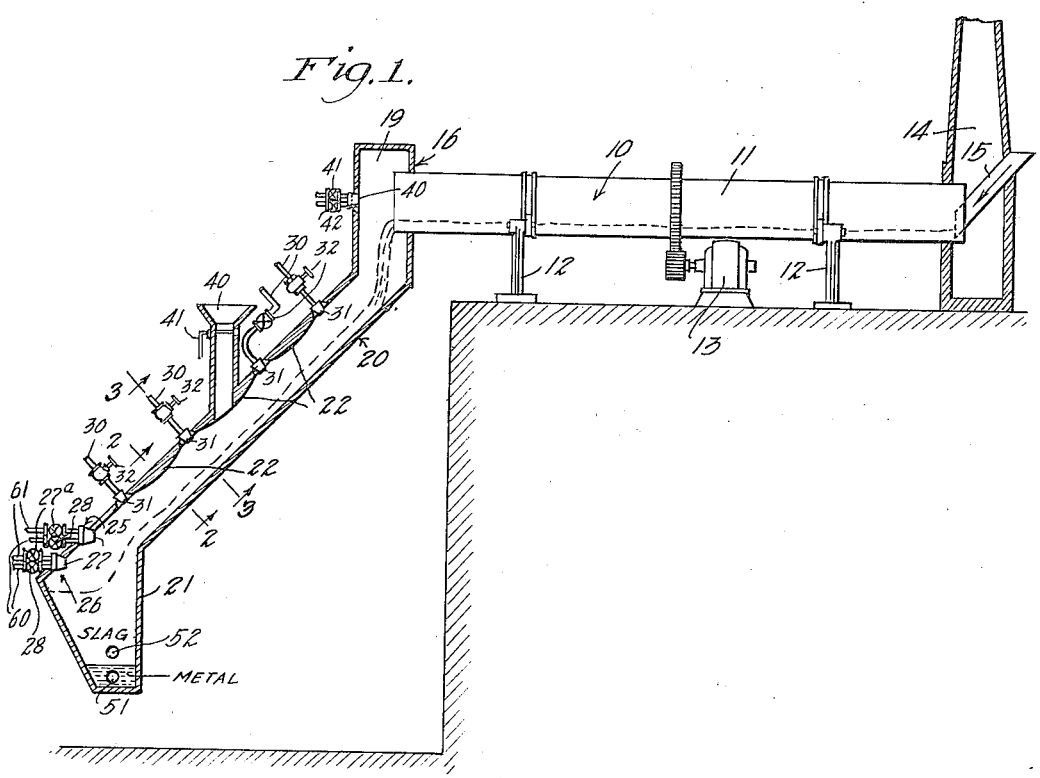
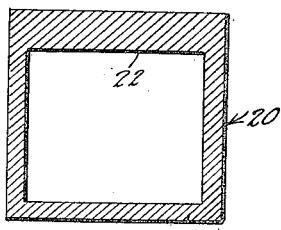
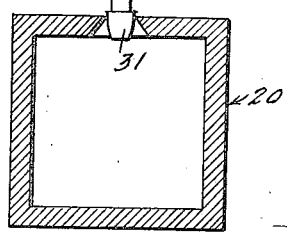

Patented Oct. 21, 1924.

1,512,262

UNITED STATES PATENT OFFICE.

JOHN ALLINGHAM, OF LOS ANGELES, CALIFORNIA.

PROCESS OF REDUCING ORE.

Application filed August 1, 1921. Serial No. 489,080.

*To all whom it may concern:*

Be it known that I, JOHN ALLINGHAM, a subject of Great Britain, residing at Los Angeles, in the county of Los Angeles, State of California, have invented certain new and useful Improvements in Processes of Reducing Ore, of which the following is a specification.

This invention has to do with a process of reducing ore, particularly iron ore, and it is an object of the invention to provide a simple, commercially practical process by which ore can be reduced with petroleum or any of its derivatives.

In certain localities in the western part of the United States, for instance, in certain mountainous districts of California, there are large deposits of iron ore, which have never been worked because of the absence of coal for making coke. Close to these deposits, however, there are large productive oil fields. For years effort has been made to find a commercially successful process of reducing iron ore with petroleum so that the above mentioned deposits can be worked with commercial success. As far as applicant is aware no process has in the past been invented which will satisfactorily and economically accomplish this result.

By the present invention I have provided a process for successfully reducing iron ore with petroleum and without the use of coke. With the present process I can reduce iron ore with petroleum or its derivatives economically and expeditiously.

I have found that, in endeavoring to reduce iron ore with hydrocarbon or liquid fuels it is impracticable to mix the fuel with the ore as is done with coke; for the liquid fuel clogs up the mass and makes it impossible to pass sufficient gas or heat through the mass to maintain through it a sufficient temperature to start and keep up the reducing reaction. On the other hand, if a hydrocarbon flame is projected at the ore, or the ore passed through such a flame; in order to keep up the requisite temperature it is necessary to supply such a quantity of air as to make it impossible to maintain reducing conditions. I find that by supplying air with an increased content of oxygen, or by supplying substantially pure oxygen, I am enabled to maintain a sufficient temperature and at the same time maintain reducing conditions.

In accordance with the invention the ore may be first mixed with carbonaceous material, which may be, or which may include petroleum, coke or coal dust. The mixture of ore and carbonaceous material is then subjected to a reducing non-oxidizing flame produced by petroleum and oxygen or a gas rich in oxygen. A flame sufficiently hot to reduce the ore and of such character as to not re-oxidize the iron can be produced by supplying a gas, say air, rich in oxygen, and petroleum in such proportions as to effect complete consumption of the oxygen and not of the petroleum. For proper reduction there must be enough oxygen present to produce the required heat, and there must be an excess of oxidizable substances (carbon, hydrogen, etc.) present, either in the flame, or mixed with the ore, or both.

For the purpose of clearly explaining my invention I shall describe in detail a particular preferred and specific form of it and will describe it as it may be carried out in a simple form and type of apparatus. In the accompanying drawings which illustrate said apparatus Fig. 1 is a vertical sectional view, Fig. 2 is an enlarged transverse detail sectional view taken as indicated by line 2—2 on Fig. 1; and Fig. 3 is an enlarged detail sectional view taken as indicated by line 3—3 on Fig. 1.

In the drawings numeral 10 designates a typical rotary heating furnace comprising a horizontally disposed cylindrical shell 11 rotatably carried by suitable supports 12 and arranged to be suitably driven by a motor 13. One end of the rotary furnace 10 extends into a stack or flue 14 and has a feed spout 15 extending into it, while the other end opens into the upper end of an inclined shaft furnace 16. The particular rotary furnace 10 set forth in the drawings is merely a typical pre-heating or pre-treating furnace and is intended only to typify the general character of furnace that may be employed in carrying out the present process.

The inclined shaft furnace 16, herein set forth to illustrate the invention, is formed with a vertical portion 19 into which the discharge end of the rotary furnace 10 extends, an inclined portion 20 extending downwardly from the vertical portion 19 at an angle of approximately 50° with the horizontal, and a receiver 21 at the lower end of the inclined portion 20. The construction of the inclined shaft furnace 16 may be such as to suit any particular circumstances. It is preferred that the furnace 16 be substantially square in cross sectional configuration, as shown in Figs. 2 and 3 of the drawings, and that the upper wall of the inclined portion 20 be formed with projections or reverberatory arches 22. The reverberatory arches, it will be understood, may be formed integrally with the upper wall of the furnace and may be varied considerably in size, proportions and number, in various designs of furnaces or under various circumstances.

At or near the lower end of the inclined portion 20 of furnace 16 are arranged liquid fuel burners 25 and 26. The burners have heads 27 which discharge into the furnace and have pipes 60 supplying liquid fuel or petroleum to them, and pipes 61 supplying a mixture of air and oxygen to them. Valves 28 are arranged in the pipes 60 to control the supply of fuel while valves 27 are arranged in the pipes 61 to control the supply of oxygen and air. The burner heads 27 act to mix the fuel with the air and oxygen and to distribute the mixture into the furnace. It is to be understood, of course, that the present invention can be carried out in various forms of apparatus and that the burners used in the apparatus may be of various types and constructions and may be arranged in various manners.

In the particular form of apparatus shown in the drawings pipes 30 may be provided to supply petroleum, or other carbonaceous fuel or reducing substance, to nozzles 31 which discharge into the inclined portion of the furnace 16 at suitably spaced points as illustrated in Fig. The nozzles 31 are preferably arranged at the upper wall of the inclined portion 20 and the pipes 30 are preferably equipped with suitable control valves 32. The nozzles 31 are such as to spray or distribute the petroleum into the furnace onto the layer of ore passing down its inclined bottom.

In practicing the process provided by the present invention the ore is preferably first crushed or ground to about quarter inch size and is mixed with carbonaceous material and petroleum oil. The carbonaceous material may be such as residues from oil refineries or gas works and the petroleum oil may be crude or residue oil. In practice, in the case of iron ore (oxides) a satisfactory mixture of ore, carbonaceous material and oil comprises by weight approximately 80% ore and 20% carbonaceous material. The 20% carbonaceous material may comprise about 15% carbon and 5% petroleum oil. It may be stated that pitch may be used in place of crude or residue oil if desired. Of course, a suitable flux is used, as desirable. The mixture just described is fed into the rotary furnace 10 through the feed chute 16 and as it passes through the rotary furnace it is preliminarily heated by the hot gases passing up from the inclined shaft furnace. A burner 40 may be arranged to discharge directly into furnace 10 and may be supplied with liquid fuel and preheated air under control of valves 41 and 42. This burner may or may not be used as required. The furnace 10 is primarily a preheating furnace and does not have a temperature high enough to cause complete reduction of the ore; although a certain amount of reduction, say $Fe_2O_3$ to $Fe_3O_4$ or to a mixture of $Fe_2O_3$ and $FeO$ may be there carried on. Sintering or nodulizing of the ore may take place in furnace 10. And if the ore is not an oxide it may be in some cases oxidized in furnace 10.

The mixture upon reaching the discharge end of the rotary furnace 10 enters the inclined furnace 16 and passes downwardly through the inclined portion 20 thereof in a comparatively thin sheet or layer until it is deposited in the receiver 21. The ore while in the inclined portion 20 of the furnace 16 is maintained at the proper temperature by the combustion of fuel supplied by the nozzles 31 and the burners 25 and 26. In accordance with the present invention the pipes 60 supply the burners 25 and 26 with petroleum oil or carbonaceous or hydrocarbonaceous gas while the pipes 61 supply the burners with oxygen or a mixture of air and oxygen, containing, say, from 30 to 50% or more of oxygen. When the expressions "high in oxygen" and "an excess of oxygen" are used in the claims, it is intended that they mean a sufficient amount of oxygen to effect the results herein set forth. Enough oxygen is mixed with the air supplied the burners to raise combustion temperatures in the furnace 16 such as will cause reduction of the ore and the production of iron, yet not enough to re-oxidize the iron. Enough fuel or petroleum is supplied to the furnace by the pipes 60 and 30 to unite with all of the oxygen supplied to the burners by the pipes 61 and also the oxygen of the ore. With enough fuel or petroleum present in the furnace 16 to unite with all the oxygen supplied to the burners and present in the ore intense heat is generated and a reducing atmosphere is maintained. The carbonaceous material and petroleum mixed with the ore before it is fed into the apparatus and also the petroleum or carbonaceous material supplied by the pipes 30, is in intimate contact with the ore when it reaches the zone where a reducing condition exists so that the oxygen in the ore unites with it leaving slag and iron Fe. In practice it may be found desirable to preheat the mixture of oxygen and air before it is introduced into the furnace. Further, the amount mixed with the air will, of course, vary under various working conditions and in various apparatus and should be just sufficient to produce and maintain a reducing condition in the furnace. In the particular apparatus shown in the drawings the action of the petroleum supplied through nozzles 31 in aiding the reduction of the ore is greatly assisted or increased by the action of the reverberatory arches 22 which cause the flame and therefore the petroleum to be thrown or directed into and virtually through the ore as it passes downwardly through the furnace. It will be understood, of course, that the valves 32 are regulated to supply the proper amount of excess petroleum to the furnace and ore being reduced and that the valves 27a and 28 may be regulated so that the proper amounts or air and oxygen and petroleum enter the furnace.

The amount of oxygen, in proportion to the amount of fuel introduced by the burners, of course depends on the amount of fuel that is otherwise introduced to the ore. For instance, the amount of oxidizable matter otherwise introduced to the ore may be sufficient to take up the ore oxygen. In that case a neutral flame is maintained. If the amount of such oxidizable substance is less than this, then a reducing flame is maintained.

The fluxes are preferably added to the ore in the inclined portion 20 of the furnace through a hopper 40 provided for that purpose. The amount of fluxing material added to the ore or introduced into the furnace may be controlled by a suitable control device 41 arranged in connection with the hopper and it will be understood that various fluxes may be used as circumstances may require. For instance, when iron ore is being reduced lime-stone, salt, and trona may be advantageously used under ordinary circumstances. Generally it will be found advantageous to introduce lime-stone and a small amount of trona.

The reduced ore is discharged from the inclined portion 20 into the receiver 21 where the metal goes to the bottom and the slag accumulates at the top or above the metal. Suitable openings 51 and 52 are provided to permit the metal and slag being drawn off at suitable intervals.

Having described a preferred form and carrying out of my invention, I claim:

1. A method of reducing ores which embodies subjecting a body of ore to a flame produced by liquid fuel and air containing an excess of oxygen, the proportions of materials being such that the oxygen is substantially completely consumed.

2. A method of reducing ores which embodies subjecting a body of ore to a flame produced by liquid fuel and air containing an excess of oxygen.

3. A method of reducing ores which embodies subjecting a body of ore to a flame produced by liquid hydrocarbon and air containing an excess of oxygen.

4. A method of reducing ores which embodies subjecting a body of ore in a thin stream to a non-oxidizing flame produced by petroleum and a gas rich in oxygen.

5. A method of reducing ores which embodies introducing to the ore an oxidizable substance, and subjecting the mixture in a thin stream to a non-oxidizing flame produced by petroleum and a gas rich in oxygen.

6. A method of producing an ore reducing atmosphere, comprising burning liquid hydrocarbonaceous material in air containing at least thirty per cent oxygen.

7. A method of reducing ores which embodies mixing hydrocarbonaceous material including petroleum with the ore, and burning hydrocarbonaceous material in a gas high in oxygen in the presence of the mixture.

8. A method of reducing ores which includes mixing substantially four parts by weight of ore with one part of hydrocarbonaceous material including petroleum, and burning petroleum in air containing an excess of oxygen in the presence of the mixture.

9. A method of reducing ore which includes mixing substantially four parts by weight of crushed ore with one part of hydrocarbonaceous material including petroleum, and burning in the presence of this mixture liquid hydrocarbon in air containing at least thirty per cent oxygen.

In witness that I claim the foregoing I have hereunto subscribed my name this 19th day of July, 1921.

JOHN ALLINGHAM.

Witness:
VIRGINIA BERINGER.